(12) United States Patent
Herrmann et al.

(10) Patent No.: US 10,060,525 B2
(45) Date of Patent: Aug. 28, 2018

(54) HYDRAULIC CONTROL DEVICE FOR AN AUTOMATIC TRANSMISSION

(71) Applicant: ZF Friedrichshafen AG, Friedrichshafen (DE)

(72) Inventors: Markus Herrmann, Scheidegg (DE); Thilo Schmidt, Meckenbeuren (DE); Bernd Allgaier, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 143 days.

(21) Appl. No.: 15/029,822

(22) PCT Filed: Sep. 17, 2014

(86) PCT No.: PCT/EP2014/069757
§ 371 (c)(1),
(2) Date: Apr. 15, 2016

(87) PCT Pub. No.: WO2015/055365
PCT Pub. Date: Apr. 23, 2015

(65) Prior Publication Data
US 2016/0265657 A1    Sep. 15, 2016

(30) Foreign Application Priority Data
Oct. 17, 2013    (DE) .................. 10 2013 221 038

(51) Int. Cl.
*F16H 61/02*    (2006.01)

(52) U.S. Cl.
CPC ..... *F16H 61/0276* (2013.01); *F16H 61/0206* (2013.01); *F16H 61/0251* (2013.01); *F16H 61/0267* (2013.01); *F16H 2061/026* (2013.01)

(58) Field of Classification Search
CPC ............ F16H 61/0279; F16H 61/0276; F16H 61/0206; F16H 61/0251; F16H 61/0267; F16H 61/0253
See application file for complete search history.

(56) References Cited

U.S. PATENT DOCUMENTS 3,667,501 A * 6/1972 Snoy ................. F15B 13/08
                                        137/596.16
5,199,313 A * 4/1993 Muller ............. F16H 61/0251
                                        137/596.16

(Continued)

FOREIGN PATENT DOCUMENTS

DE    4124384 C1    1/1993
DE    19858541 A1    6/2000

(Continued)

OTHER PUBLICATIONS

German Search Report for DE 102013221038 A1, dated Aug. 19, 2014, 8 pages.

(Continued)

*Primary Examiner* — Stacey A Fluhart
(74) *Attorney, Agent, or Firm* — Dority & Manning, P.A.

(57) ABSTRACT

When the stop valve is in a first shifting position, a torque-transferring shift element is sealed tight against the rest of a hydraulic system by a stop valve, such that the actuating pressure enclosed in the shift element remains essentially constant or does not decrease. The stop valve is formed and arranged in the hydraulic system such that the stop valve is held in the first shifting position by the force of a barrier pressure generated by the pump, and, upon a standstill of the pump or falling below a certain value of the pressure generated by the pump, the stop valve is automatically displaceable at least through the action of the trapped shift element pressure into a second shifting position, in which (Continued)

the respective shift element is connected to the rest of the hydraulic system and the shift element is open.

20 Claims, 6 Drawing Sheets

(56) References Cited

U.S. PATENT DOCUMENTS

| | | | | |
|---|---|---|---|---|
| 5,722,459 | A | * | 3/1998 | Kim .................... F15B 13/0433 |
| | | | | 137/625.64 |
| 6,024,200 | A | * | 2/2000 | Jang .................... F15B 13/0402 |
| | | | | 137/625.64 |
| 6,544,139 | B1 | | 4/2003 | Gierer et al. |
| 6,948,524 | B1 | | 9/2005 | Sowul et al. |
| 2005/0205138 | A1 | | 9/2005 | Sowul et al. |
| 2006/0091340 | A1 | | 5/2006 | Stevenson |
| 2011/0028273 | A1 | * | 2/2011 | Deishi ................ F16H 61/0206 |
| | | | | 477/115 |
| 2013/0098465 | A1 | * | 4/2013 | Stafford .................. F16K 17/00 |
| | | | | 137/12 |
| 2013/0281253 | A1 | | 10/2013 | Ross et al. |
| 2013/0341152 | A1 | * | 12/2013 | Otanez .................... F16D 25/14 |
| | | | | 192/85.63 |

FOREIGN PATENT DOCUMENTS

| | | |
|---|---|---|
| DE | 10205411 A1 | 8/2003 |
| DE | 102006024183 A1 | 11/2007 |
| DE | 102013209569 A1 | 12/2013 |

OTHER PUBLICATIONS

International Search Report (English Translation) PCT/EP2014/069757, dated Jul. 31, 2015. (3 pages).

* cited by examiner

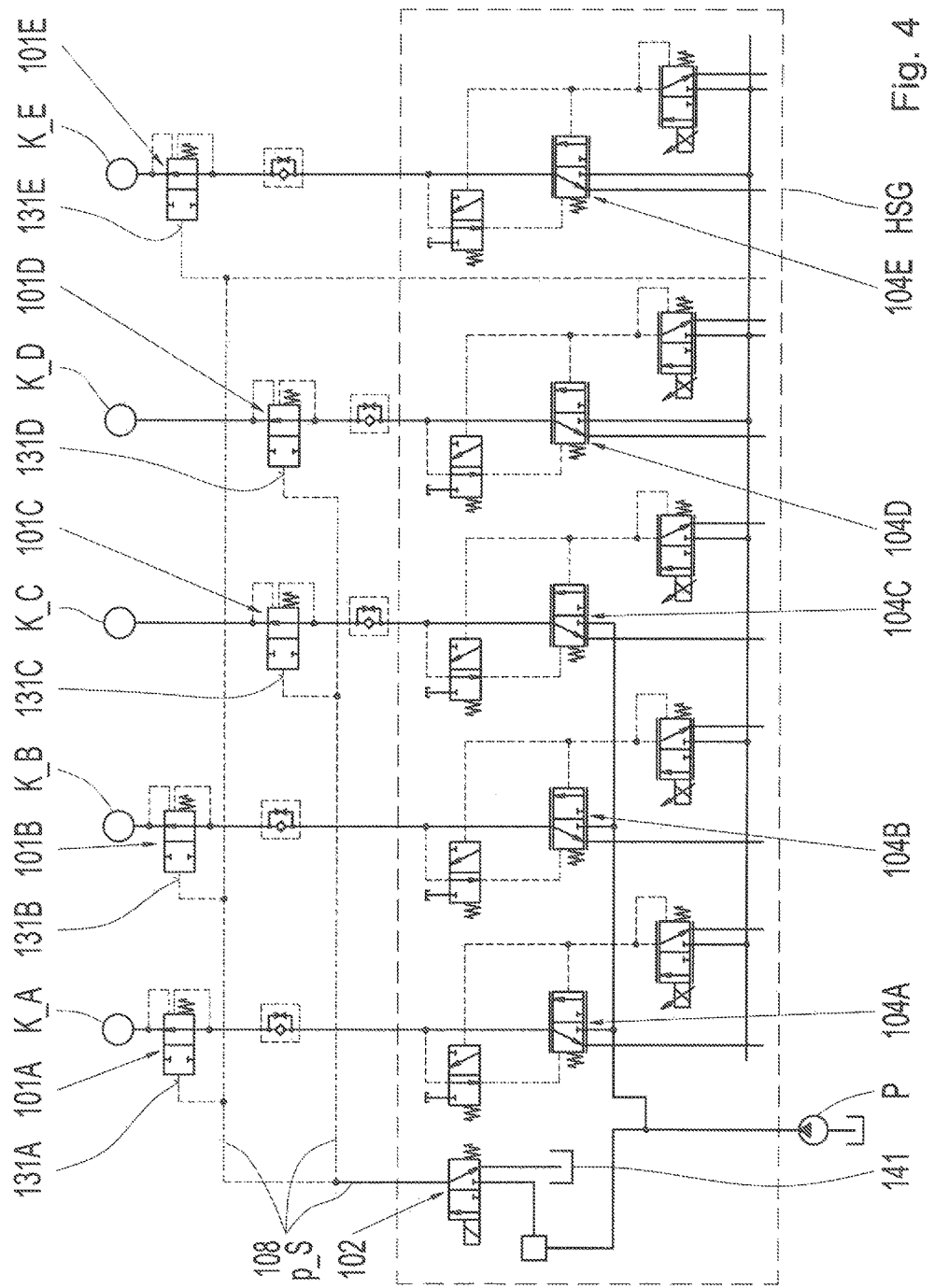

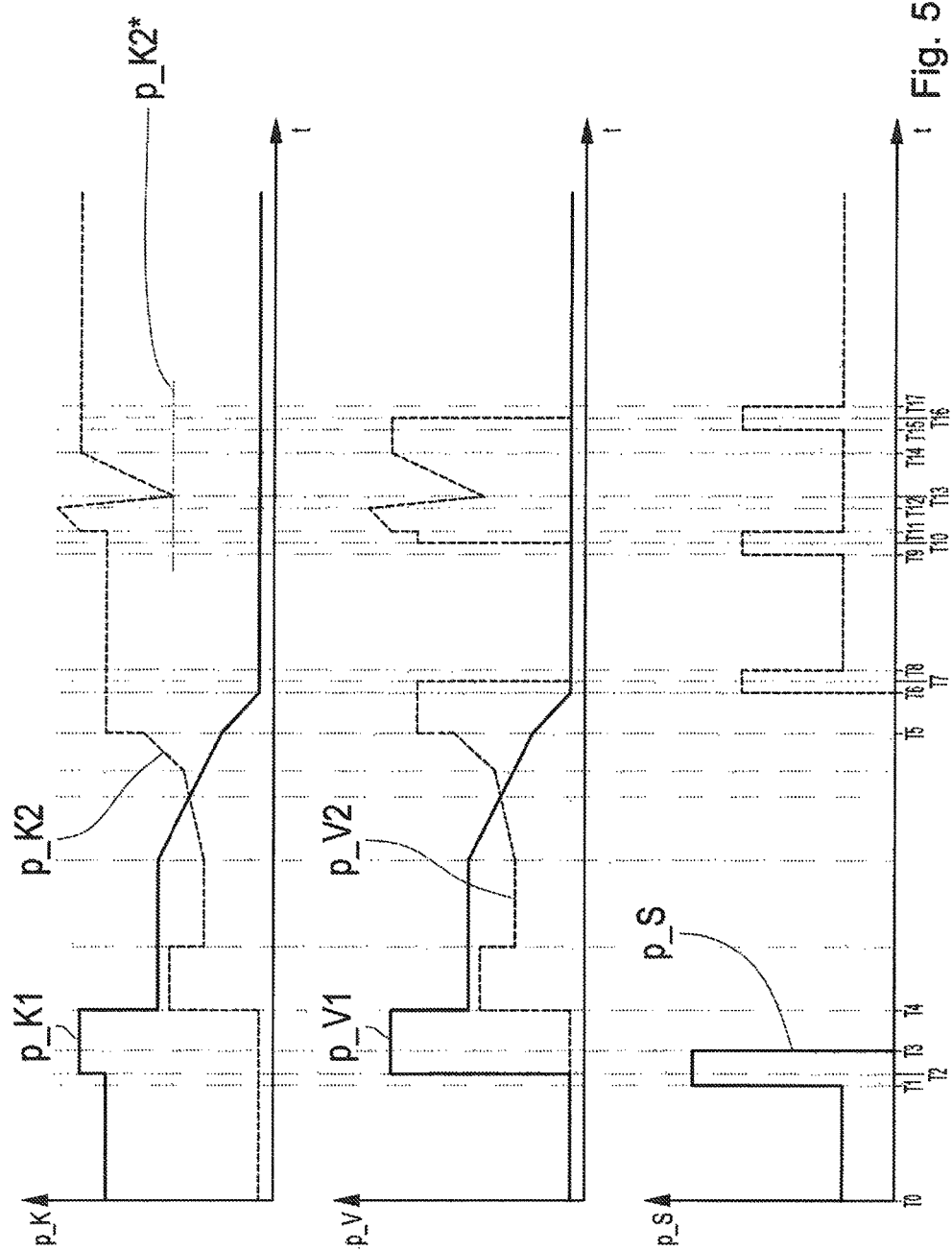

HYDRAULIC CONTROL DEVICE FOR AN AUTOMATIC TRANSMISSION

FIELD OF THE INVENTION

The invention relates to a hydraulic control device for an automatic transmission.

BACKGROUND

In today's automatic transmissions, such as that shown in DE 198 58 541 A1, transmission stages are shifted by shift elements, i.e. clutches or brakes, formed as multi-disk shift elements or claw shift elements. The gearshift usually takes place hydraulically, through shift devices in the form of piston/cylinder units, which are subjected to pressure oil. The pressure oil is conveyed by a pump and is guided via oil supply lines from the transmission housing through so-called "rotary oil supply lines" into the rotating transmission shaft and then to the shift devices. Losses arise through the hydraulic circuit, such as through the performance of the transmission oil pump, the sealing points, a pressure drop in the supply lines or leakage. Losses burden the efficiency of the transmission. This invention is based on the fact that losses caused by the hydraulic circuit, in particular by the gearshift, must be kept as low as possible in order to achieve as high a degree of transmission efficiency as possible. A particular problem is that the oil pressure in a hydraulic cylinder with a closed shift element (the so-called "closing pressure") must be constantly tracked (i.e., maintained) in order to transfer the necessary torque in the shift element. This pressure must be applied by the hydraulic pump, which is driven by the engine of the motor vehicle, by which losses are caused, such that the generation of hydraulic power increases fuel consumption and CO2 emissions, and reduces the available energy to drive the vehicle.

A hydraulically shiftable multi-disk shift element has been known from DE 102 05 411 A1 of the applicant, which, in a closed state (i.e. upon the transfer of torque) outside of gearshifts, is mechanically locked by a locking device. Thereby, the pressing force is maintained between the multi-disks without a hydraulic pressure and the transmission oil pump is unburdened. In one variant that is not shown, the locking device is formed as a stop valve, which is arranged in the feed area of the hydraulic cylinder. Thus, the pressure chamber of the cylinder to the pump is blocked and the contact pressure in the multi-disk pack is maintained.

Thus, the pressure to be generated by the pump may be lowered and the power input of the pump may thereby be reduced. The pressure generated by the pump is reduced to a necessary minimum and not completely switched off, since, even with closed and locked shift elements, the need for oil at a low pressure level continues to exist in the transmission, for example, for cooling, lubrication or pre-filling in preparation for a shifting process.

A pressure maintenance device of a transmission is known from U.S. Pat. No. 6,948,524 B1 which features a stop valve that encloses the actuating pressure of a shift element after the pump, acting as a pressure source, has discontinued its operation and the rest of the system is pressureless. The stop valve is formed in such a manner that, under the action of a spring force with a pump that is turned off (e.g. a pressureless hydraulic system), it moves into the shut-off position. Such a valve position is also referred to as "normally closed" and has the disadvantage that, with a pressureless transmission, all previously closed shift elements remain closed, by which the last transmission stage remains engaged.

In this manner, the functional reliability of the automatic transmission is disadvantageously affected, since, in special cases, such as upon engine standstill, the blocking of the automatic transmission may arise. The automatic transmission is also blocked, for example, against a tow movement.

SUMMARY OF THE INVENTION

The invention is subject to the task of providing, in a simple and space-saving manner, a functionally reliable hydraulic control device for an automatic transmission, by means of which the required pressure to be generated by the pump, and thus the power consumption of the pump, can be reduced, and the fuel consumption of a vehicle with this automatic transmission can be minimized. Additional objects and advantages of the invention will be set forth in part in the following description, or may be obvious from the description, or may be learned through practice of the invention. In accordance with the invention, this task is solved by the characteristics described and claimed herein.

A hydraulic control device for an automatic transmission comprises at least one stop valve allocated to a shift element, multiple pressure adjusting devices allocated to a shift element, and a barrier pressure adjusting device allocated to the stop valve. The automatic transmission comprises multiple frictional-locking shift elements, whereas, for a transmission stage, at least two shift elements for transferring a torque by means of the pressurization through a hydraulic actuating pressure, generated by a pressure source (such as a pump) and adjusted in the respective pressure adjusting device, are kept closed. In this manner, at least in one operating state of the automatic transmission in which a transmission stage is engaged and no gearshift occurs, the stop valve is in a first shifting position, in which at least the torque-transferring shift element is sealed tight at the respective pressure adjusting device by means of the allocated stop valve, such that the actuating pressure enclosed in the shift element remains essentially constant or does not decrease, such that a torque can be transferred regardless of the pressure generated by the pump.

In accordance with exemplary aspects of the invention, at least one stop valve is formed and arranged in the hydraulic system in such a manner that the stop valve is held in the first shifting position by the force of a barrier pressure generated by the pump. Upon falling below the barrier pressure generated by the pump, the stop valve is automatically displaceable at least through the action of the trapped shift element pressure into a second shifting position, in which the respective shift element is connected to the respective pressure adjusting device.

In a stationary driving state, the pressure generated by the pump, also referred to as system pressure, may advantageously be reduced below the value of the actuating pressure necessary for the actuation of the shift element, since the clutch may, regardless of the system pressure, continue to remain closed through the enclosed actuating pressure, also referred to as the shift element pressure or the clutch pressure, and may transfer a torque. Through the reduction in the system pressure, the power consumption of the pump decreases, by which the overall degree of efficiency of the automatic transmission increases.

The advantage of the hydraulic control device in accordance with exemplary aspects of the invention is that, when the pump is at a standstill, the shift elements are open and thus a blocking of the transmission is not possible, such that high functional reliability is provided.

In an advantageous exemplary arrangement of the hydraulic control device, the stop valve is formed as a shiftable seat valve, which comprises a seat piston, which is guided in an axially displaceable manner into a valve bore formed in a housing. Thereby, the seat piston features, at one end, a first effective area that can be subjected to the barrier pressure in an axial projection and, at a second end, at least one additional effective area that can be subjected to an additional pressure in an opposite displacement direction in an axial projection.

Through the arrangement as a seat valve, compared to a slide valve, a tight sealing of the actuating pressure in the shift element is possible, such that the actuating pressure is not able to decrease.

In an advantageous exemplary variant of this, the valve bore is formed as a stepped bore, which features multiple bore sections of different diameters.

A preferred exemplary variant is formed in such a manner that the stop valve features four ports, of which three ports are connected to pressure adjusting devices for their pressurization or ventilation, and one port is connected to a pressureless area. Through the small number of pressurized ports, a high degree of tightness (e.g. low leakage losses) and an arrangement that saves installation space is possible.

In this connection, it is provided in an advantageous arrangement that the valve bore of the stop valve is penetrated in a radial direction by four pressure chambers, whereas, in the first pressure chamber, the barrier pressure is effective at the first effective area, the second pressure chamber is vented, the third pressure chamber is connected directly to the shift element, and the fourth pressure chamber can be pressurized by a clutch valve. Thereby, a circle-shaped or ring-shaped sealing seat is formed at the housing between the third and the fourth pressure chambers, at which the seat piston abuts the first shifting position, by which the third pressure chamber is separated from the fourth pressure chamber. In this manner, an area of the axial projection surface at the second end of the seat piston, radially outside of the sealing seat in the third pressure chamber, can be subjected to the clutch pressure, and forms a second ring-shaped effective area. An additional area of the axial projection surface at the second end of the seat piston within the circle delineated by the sealing seat can be subjected to the clutch valve pressure in the fourth pressure chamber, and forms a third effective area. In the second shifting position of the stop valve, the third and the fourth pressure chambers are connected to each other and thus the clutch pressure corresponds to the clutch valve pressure, which is effective at the second and third effective areas on the second end of the seat piston.

Depending on the shifting position of the seat piston valve, this advantageously results in different valve transmission ratios (e.g. different ratios of the effective areas to each other) which are also subjected to different pressures.

It is advantageous that the seat piston comprises multiple cylindrical piston sections, whereas, at the first end of the seat piston, a front surface in the shape of a circular cross-section is formed at a first piston section, whereas the first tappet section features the cylinder with the largest diameter, and at least one cylinder of a smaller diameter is formed at the second end, whereas the piston section with the smallest diameter is formed at the second end of the seat piston, and whereas the transition from the second to the third piston section forms a ring-shaped surface, which with the housing forms a ring-shaped sealing seat between the third and fourth pressure chambers.

In one variant, it is possible that the seat piston is formed as one piece.

With an alternative variant, the seat piston is formed in multiple parts, whereas the various parts are guided into various bore sections of the valve bore, such that deviations in the concentricity of the various bore sections cannot lead to the jamming of the seat piston.

An advantageous arrangement of this is that the ring-shaped sealing seat is designed as a flat seat with an elastomer seal, whereas the elastomer seal is arranged on the housing and/or on the seat piston. In this manner, a high degree of tightness is achieved and, due to the flat seat, the surface pressure between the seat piston and the housing material is kept low.

In an advantageous alternative, the hydraulic control device is designed such that the seat piston comprises multiple piston sections, whereas, at the first end of the seat piston, a front surface in the shape of a circular cross-section is formed at a first cylindrical piston section, whereas the first tappet section features the cylinder with the largest diameter, and that the seat piston features a second cylindrical piston section with a smaller diameter at its second end and subsequently a third piston section at the second piston section, which is formed in a tapering manner in a conical or frusto-conical or spherical shape.

In an additional arrangement, it is provided that a sealing element is mounted between the vented second pressure chamber and the third pressure chamber at an inner contour of the housing and/or at a cylindrical outer contour of the seat piston in order to prevent leakage from the shift element to the vented second pressure chamber. Thereby, advantageously, the shift element may be reliably maintained at a constant high value.

In an advantageous arrangement, the ratio of the three effective areas to each other is selected so that a barrier pressure less than the clutch pressure is sufficient, in order to hold the stop valve counter to the sum of the forces arising from the clutch pressure sufficient for transferring the maximum torque and the clutch valve pressure in the first shifting position. In this manner, the ratio of the effective areas determines the extent to which the system pressure outside the gearshifts are reduced, since the stop valve must be kept closed.

In this connection, it is provided that the sufficient value of the barrier pressure amounts to a maximum of three (3) bar.

In an advantageous alternative, a compression spring is arranged between the second end of the seat piston and the adjacent end of the valve bore, which, in addition to the clutch valve pressure, exerts a force in the direction of the second shifting position on the seat piston. By means of the spring, it is possible that, with a pressureless transmission or hydraulic system, the stop valve is biased towards the second shifting position.

In this connection, it is possible that, with the pump at a standstill or the falling below of a certain value of the pressure generated by the pump, or with a pressureless automatic transmission, the stop valve is automatically displaceable through the action of the trapped shift element pressure and/or the action of the force of the compression spring into the second shifting position, in which the respective shift element is connected to the rest of the hydraulic system, and thus the pressureless pump and the shift element are securely opened.

In this alternative arrangement, the ratio of the three effective areas to each other is selected in such a manner that a barrier pressure, corresponding at a maximum to the system pressure reduced outside of the gearshifts, is sufficient in order to hold the stop valve in the first shifting position counter to the sum of the forces arising from the clutch pressure sufficient for transferring the maximum torque, the clutch valve pressure and the force of the spring.

An advantageous arrangement is that a stop valve is allocated in each case only to one shift element, and whereas the hydraulic control device features a barrier pressure adjusting device, through which all the stop valves are subjected to the same barrier pressure.

In an alternative arrangement of the invention, a first barrier pressure adjusting device for actuating the stop valves of a part of the shift elements of the automatic transmission and an additional barrier pressure adjusting device for actuating the stop valves of an additional part of the shift element of the automatic transmission are provided. In this manner, different barrier pressures, independent of each other, can be adjusted for the respective groups of shift elements or their stop valves.

In an additional possible embodiment of the invention, at least one additional stop valve is formed in such a manner and is arranged in the hydraulic system such that it is held in the second shifting position through the force of a barrier pressure generated by the pump and, with a pump at a standstill or the falling below of a certain value of the barrier pressure, the stop valve is automatically, for example by means of a compression spring, displaceable into the first shifting position, in which the respective shift element is closed tight at the respective pressure adjusting device.

In this connection, it is provided that an automatic transmission features a hydraulic control device according to any one of the preceding variants or embodiments.

It is thereby possible that, in the automatic transmission, at least two shift elements are formed in such a manner that they are open if the actuating pressure falls below a certain value.

In an additional exemplary arrangement of the invention, it is provided that one part of the shift elements is closed at an actuating pressure and is able to transfer a torque, and an additional part of the shift elements is closed if its pressure adjusting devices are pressureless. The closing of these shift elements can then be effected, for example, under the action of a compression spring or electromechanically.

In one method for controlling this automatic transmission, starting from an operating state in which a shift element is closed below the clutch pressure, prior to an intended increase in the clutch valve pressure, the barrier pressure is raised in such a manner that the stop valve is moved into the second shifting position only if the clutch valve pressure is greater than or equal to the trapped clutch pressure. In addition, starting from an operating state in which the stop valve, and thus also the shift element, is opened and the shift element is then to be closed, the stop valve is closed after the clutch valve pressure has been raised to the extent that the shift element is closed. In addition, after the lowering of the clutch valve pressure, the barrier pressure is lowered to a value that is sufficient to keep the stop valve in the first shifting position counter to the clutch pressure. This also enables a reduction in the system pressure to the value of the barrier pressure. A prerequisite for this is that the stop valve is designed to be "normally closed", e.g. shiftable into the first shifting position under the action of the barrier pressure.

BRIEF DESCRIPTION OF THE DRAWINGS

Embodiments of the method in accordance with the invention are presented in the drawings, and are described in more detail below. The following is shown:

FIG. 4 a hydraulic control device of an exemplary automatic transmission, and
FIG. 5 an exemplary diagram with chronological curves of the barrier pressure, clutch pressure and clutch valve pressure of two shift elements during a shifting process and a clutch pressure change.

DETAILED DESCRIPTION

Figure 1A:
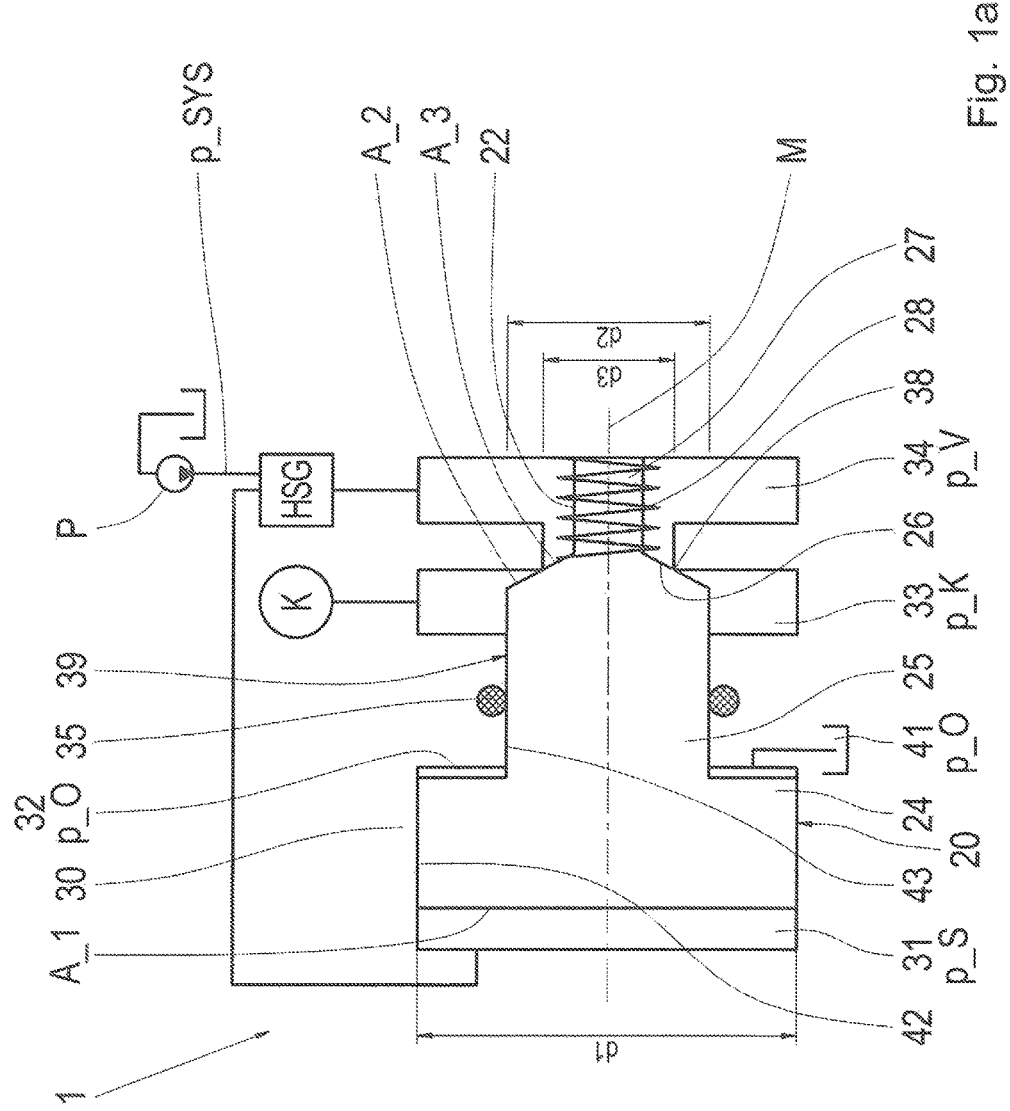
FIG. 1a a stop valve in a first shifting position.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1a shows the schematic representation of a stop valve 1 in accordance with exemplary aspects of the invention in a first shifting position. The stop valve 1 is designed as a shiftable seat valve.

The stop valve 1 comprises a rotationally symmetrical seat piston 20 with a central axis M that features, at a first end, a first cylindrical piston section 24 and a piston section 25 adjacent thereto, whereas the piston section 25 features a diameter $d\_2$ that is smaller than a diameter of $d\_1$ of the piston section 24. At a second end of the seat piston 20, it is formed in a piston section 26 tapered in a frusto-conical shape at the second end 22, whereas a third cylindrical piston section abuts the truncated cone, which is formed as a spring guide bolt 27.

The seat piston 20 is guided axially, along the central axis M, into a valve bore 39, which, in accordance with the seat piston 20 with different diameters, is formed in a housing 30. Thus, the valve bore 39 features a bore section 42 and a bore section 43. The piston section 24 is guided in an axially displaceable manner into the bore section 42, and the piston section 25 is guided in an axially displaceable manner into the bore section 43. In this manner, the housing 30 need not be a separate valve housing, but may be a part of the transmission housing or the housing of a hydraulic shift device HSG.

In the housing 30, within the valve bore 39 and around it, four pressure chambers 31, 32, 33 and 34 are formed, which in part penetrate the valve bore 39 in a radial direction, orthogonal to the central axis M. At a first end of the valve bore 39, the first pressure chamber 31 is hydraulically connected to a pressure adjusting device supplied by a pump P as a pressure source, which is arranged, for example, in the hydraulic shift device HSG. In the hydraulic shift device HSG, by means of different pressure adjusting devices, different pressures are adjusted or governed in different pressure chambers, such as a barrier pressure $p\_S$, a clutch pressure $p\_K$ and a clutch valve pressure $p\_V$. A system pressure $p\_SYS$ to be generated by the pump P is the highest pressure of the hydraulic control device in the transmission, and is also adjusted in the hydraulic shift device HSG.

The hydraulic shift device HSG need not be a closed, but may also consist of differently arranged components. A barrier pressure p_S prevailing in the pressure chamber 31 is adjusted regardless of the system pressure p_SYS, such that the barrier pressure p_S may, at a maximum, accept the amount of the system pressure p_SYS, but can be adjusted separately by means of a pressure adjusting device of the hydraulic shift device HSG. In the pressure chamber 31, the piston section 24 of the seat piston 20 is subjected to the barrier pressure p_S at an effective area A_1. The circle-shaped effective area A_1 is calculated from the diameter d_1. The pressure chamber 32, which is adjacent next to the pressure chamber 31, is vented. A vented pressure chamber is understood to mean that it is connected to an area of the transmission directly, without valves or shut-off devices arranged in between, in which area an ambient pressure p_0 prevails. Such an area is referred to below as "vented" and as "pressureless."

The pressure chamber 33 is directly connected to a shift element K, in which the clutch pressure p_K prevails. The pressure chamber 34 is connected to an area of the hydraulic shift device HSG, in which the clutch valve pressure p_V is adjusted. Just like the barrier pressure p_S, this may also accept at a maximum the amount of the system pressure p_SYS, but can be adjusted separately by means of the hydraulic shift device HSG. The valve bore 39 features a diameter d_3 between the pressure chamber 33 and the pressure chamber 34.

In the shown shifting position of the stop valve 1, or the seat piston 20, as the case may be, the seat piston 20, with its piston section 26 shaped as a conical seat, around its circumference abuts a sealing seat 38 formed in the housing 30, which is formed from a wall of the pressure chamber 33, which is turned towards the pressure chamber 34, and the valve bore 39 penetrating this. In this shifting position, the seat piston 20 seals the pressure chambers 33 and 34 against each other, such that the shift element K cannot be subjected to the clutch valve pressure p_V, and/or a clutch pressure p_K enclosed in the shift element K, and thus the pressure chamber 33, may not leak and thus decrease.

The sealing seat 38 features the diameter d_3 in a manner corresponding to the valve bore 39 in this section. In an axial projection, the seat piston 20, at its second end 22 on an effective area A_3, can be subjected to the clutch valve pressure p_V in the pressure chamber 34, whereas the effective area A_3, in the shown shifting position, is calculated as the circular surface of the diameter d_3. In the pressure chamber 33, in an axial projection, a ring-shaped effective area A_2 can be subjected to the clutch pressure p_K, whereas the effective area A_2 is calculated as the difference between the circular surfaces arising from the diameters d_2 and d_3. Thus, the effective area A_2 is located radially outside the sealing seat 38, and the effective area A_3 is located within the sealing seat 38. A total axial projection surface A_4 of the piston section 26 is calculated for the circular surface A_2+A_3 arising from the diameter d_2.

In an inner contour of the valve bore 39 or on an outer contour of the piston section 25, a sealing element 35 is arranged between the pressure chamber 33 connected to the shift element K and the vented pressure chamber 32 in order to prevent leakage from the pressure chamber 33, such that the enclosed clutch pressure p_K cannot decrease.

Figure 1B:
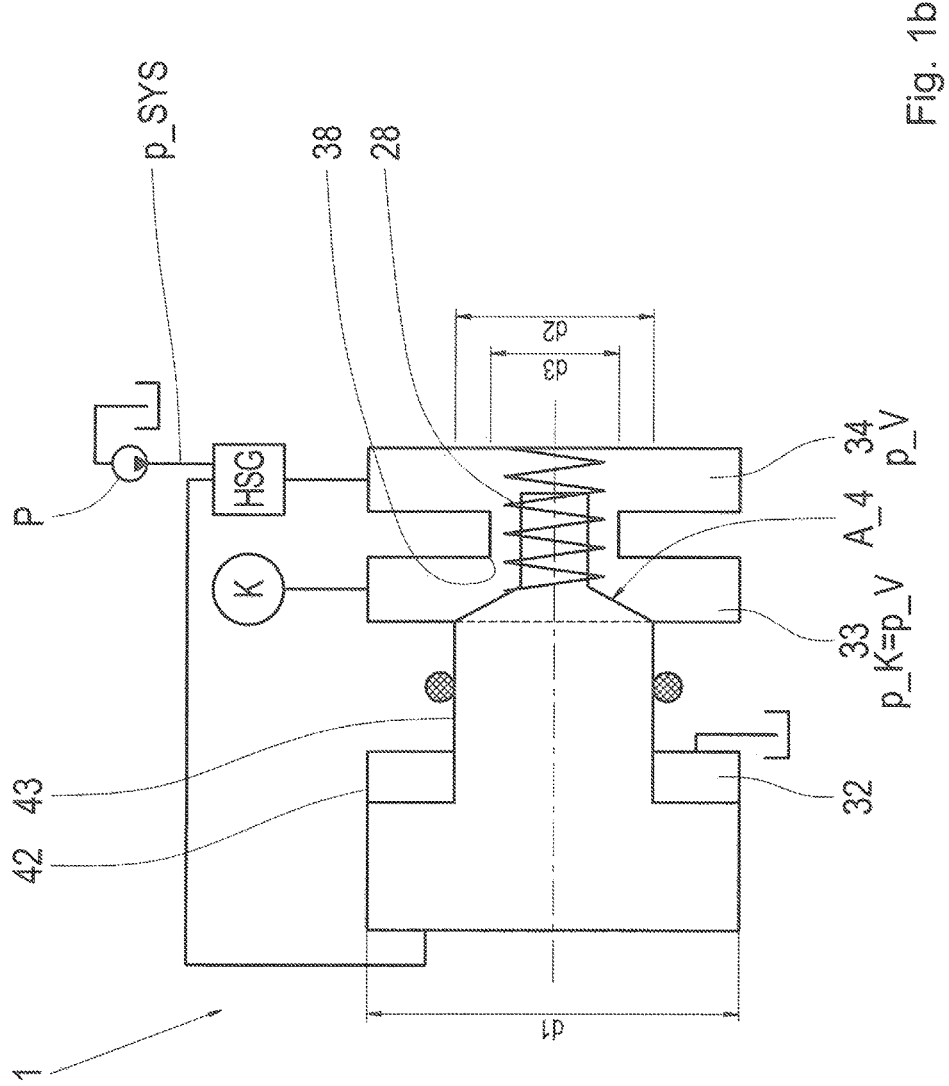
FIG. 1b a stop valve in a second shifting position.

In the shown exemplary design of the stop valve 1, a compression spring 28 is arranged around the spring guide bolt 27, which exerts a force on the seat piston 20 in any position, which tends to move it into a second shifting position shown in FIG. 1b. The compression spring 28 is not absolutely necessary to fulfill the function of the stop valve 1, but may be optionally used. However, the seat piston, in particular with an automatic transmission of the seat piston that is at a standstill or is pressureless, under the spring force always clearly occupies the second shifting position, in which the shift element K is open. This is also referred to as "normally opened."

The shown first shifting position is then occupied if a blocking force acting on the seat piston 20, which is calculated as a product of the barrier pressure p_S and an effective area A_1, is greater than the sum of the forces arising from the clutch pressure p_K, the clutch valve pressure p_V and the compression spring 28 directed counter to it. The force arising from the clutch pressure p_K is calculated as a product of the clutch pressure p_K and the effective area A_2, and the force arising from the clutch valve pressure p_V is calculated as a product of the clutch valve pressure p_V and the effective area A_3.

As mentioned above, the purpose of the stop valve 1 is is to tightly seal the shift element K against the pump P, such that the system pressure p_SYS to be generated by the pump can be lowered relative to the clutch pressure p_K, without opening the shift element K. The proportions of the effective areas A_1, A_2 and A_3 to one another are selected in such a manner that a relatively small barrier pressure p_S to be generated by the pump is sufficient to hold the seat piston 20 counter to the forces arising from the clutch pressure p_K, the clutch valve pressure p_V and—if present—the force of the compression spring 28 in the first shifting position, and to enclose the clutch pressure p_K. The clutch valve pressure p_V ultimately generated by the pump P is lowered to a pre-filling pressure level.

In order to undertake a change of transmission ratio, also referred to as a gearshift, at least one shift element must be open, and at least one additional shift element is closed by being subjected to the clutch valve pressure p_V. For this purpose, the seat piston 20 is moved into the second position, which in FIG. 1b is shown in schematic representation. The seat piston 20 has been lifted from the sealing seat 38, such that the pressure chambers 33 and 34 are connected to each other and the shift element K can be filled with the pressure medium by the pump P. Thus, in the second shifting position, the clutch pressure p_K corresponds to the clutch valve pressure p_V that is adjusted in the HSG and acts axially on the entire projection surface A_4, which is calculated from the diameter d_2, or is calculated as the sum of the effective areas A_2 and A_3. The barrier pressure p_S has been reduced in the HSG to the extent that the force of the clutch valve pressure p_V acting on the surface A_4, possibly in addition to the force of the compression spring 28 (if present), may hold the seat piston 20 in the second shifting position.

As an alternative arrangement, in order to reduce the radial constraining forces caused by a bore offset in the valve bore, the seat piston may also be designed in two pieces. This then includes a stop piston, which can be subjected to the barrier pressure, and a seat piston, which tightly shuts the shift element off against the pump. The separating plane of the two components is the vented pressure chamber.

Practice shows that, in an open position, a stiff valve is more prone to clamp. If, due to manufacturing tolerances or contamination, the seat piston is stiff in the valve bore, the barrier pressure p_S may be adjusted to the value of the clutch valve pressure p_V and, based on the surface ratios of the effective areas, the seat piston 20 may be displaced into the first shifting position counter to the clutch feed pressure p_V and the clutch pressure p_K.

FIG. 1b shows a schematic representation of a stop valve in accordance with exemplary aspects of the invention 1 in a second shifting position. Thereby, with its first end, the seat piston 20 is located at a stop in the pressure chamber 31. The pressure chambers 33 and 34 are connected to each other such that the clutch pressure p_K is equal to the clutch valve pressure p_V, which acts both on the axial projection surface A_4 at the second end of the seat piston 20 and on the shift element K. The projection surface A_4 is calculated as the circular surface arising from the diameter d_2, as the sum of the effective areas A_2 and A_3. The compression spring 28 is also preloaded in the second shifting position, such that it exerts a force on the seat piston 20 in the direction of the second shifting position.

In the event of a failure or a stopping of the drive motor of the motor vehicle and the associated standstill of the pump P, the pressure oil supply of the transmission comes to a halt and all pressures adjusted in the HSG degrade, such that, in the first shifting position of the stop valve, both the pressure chamber 31 or the barrier pressure p_S, as the case may be, and the pressure chamber 34 or and the clutch valve pressure p_V, as the case may be, are pressureless. However, the pressure chamber 33, and thus the effective area A_2, are subjected to the clutch pressure p_K. In this manner, the seat piston is displaced after stopping the pump P in its first shifting position by the enclosed clutch pressures p_K, or additionally by the force of the optionally existing spring into the second shifting position. The shift element is then hydraulically connected to the pressureless area of the hydraulic control device and the pump P, such that no shift element that is allocated a stop valve in accordance with exemplary aspects of the invention is closed. Thus, the blocking of the automatic transmission is ruled out. Thereby, for reasons of functional reliability, an additional venting option may be redundantly provided, if the stop valve is not movable into the second shifting position.

Figure 2A:
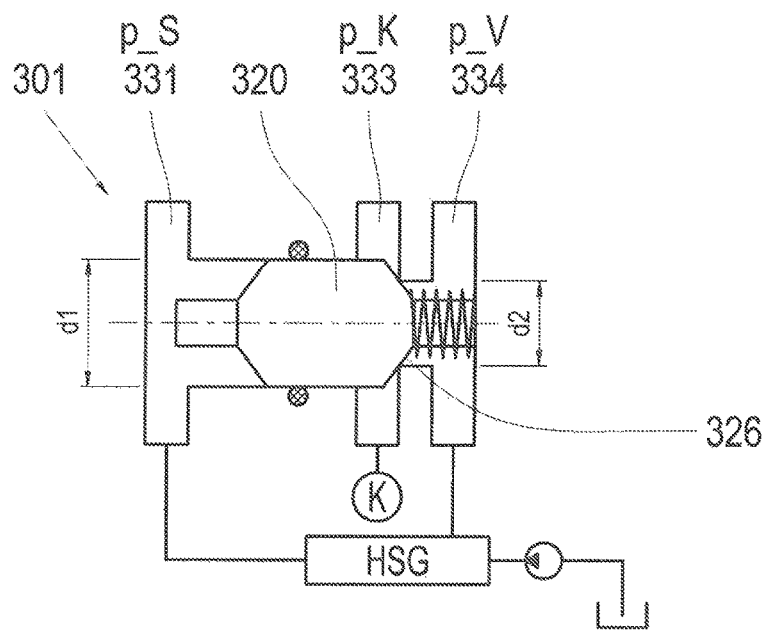
FIG. 2a an exemplary arrangement of the seat piston in a first shifting position.
Figure 2B:
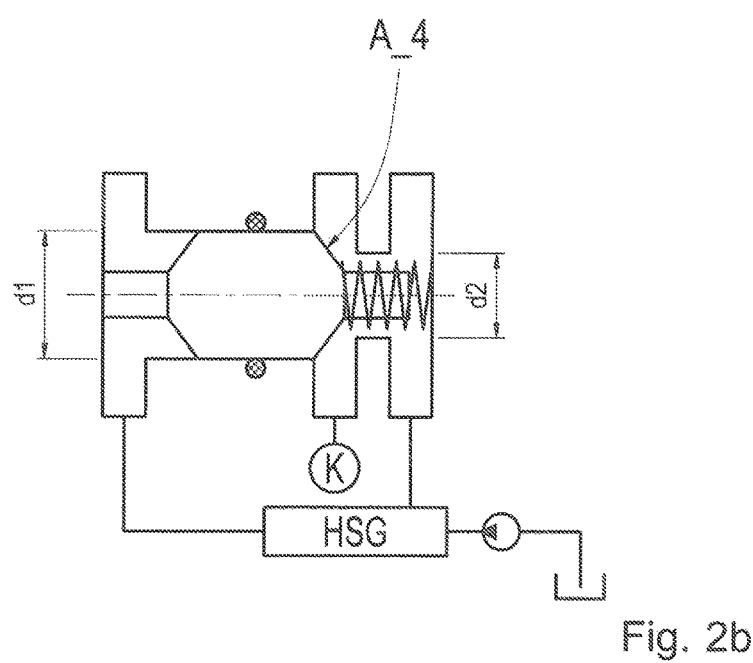
FIG. 2b an exemplary arrangement of a seat piston in a second shifting position.

FIG. 2a shows a stop valve 301 with an alternatively designed seat piston 320 in a first shifting position, in which a clutch pressure chamber 333 is separated from a clutch valve pressure chamber 334 by means of the seat piston 320. In this manner, the seat piston 320 is not designed as a stepped piston with two different outer diameters as shown in FIGS. 1a and 1b, but features an outer diameter d_1 as a maximum outer diameter, such that, on the side of a barrier pressure chamber 331, an axial projection surface as an effective area subjected to the barrier pressure p_S is as equally large as the entire axial projection surface on the side of a clutch pressure chamber 333 and a clutch valve pressure chamber 334, which, in the second shifting position of the stop valve 320 shown in FIG. 2b, can be subjected to a clutch valve pressure p_V. On the side of the barrier pressure chamber 331, a stop bolt 324 is formed at the seat piston, such that the entire seat piston 320 is formed in a symmetrical manner. The part of the seat piston 320 on the side of the clutch pressure chamber and the diameter and location of a sealing seat 338 are the same as in the stop valve shown in FIGS. 1a and 1b. In this manner, a vented compensating pressure chamber, just like the pressure chamber 32 in FIGS. 1a and 1b, is omitted, such that the structural length of the stop valve 320 and the installation space required by it is lower than that for the stop valve 20 in FIGS. 1a and 1b.

Figure 3A:
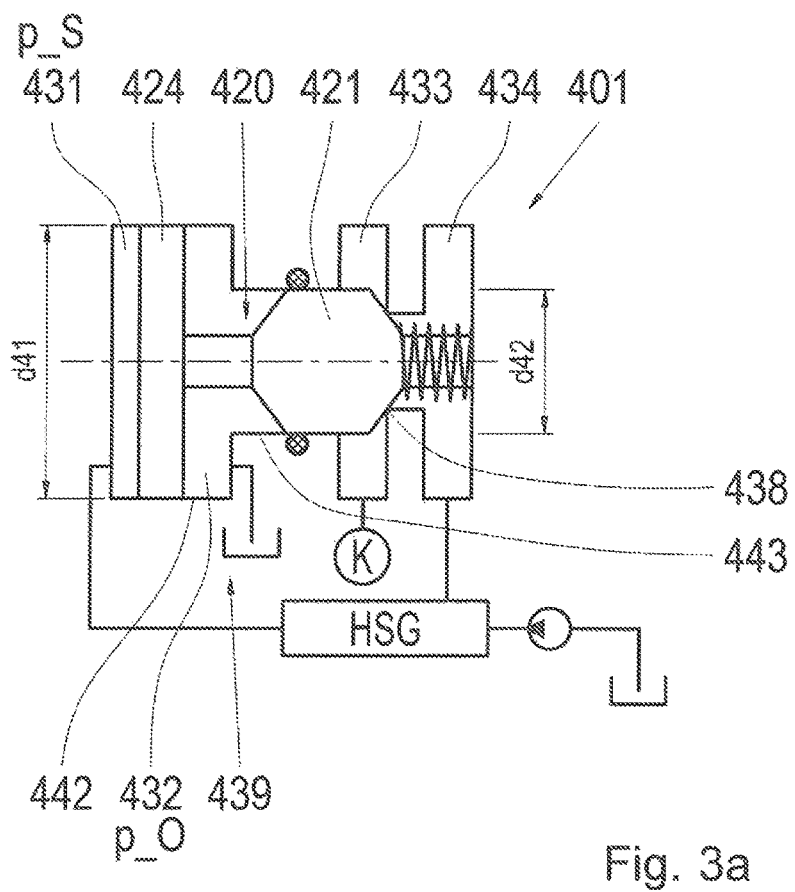
FIG. 3a a multi-part exemplary arrangement of a seat piston in a first position.

FIG. 3a shows a divided or multi-part seat piston 420 in a first shifting position of a stop valve 401, in which a clutch pressure chamber 433 is sealed by means of the seat piston 420 counter to a clutch valve pressure chamber 434.

Figure 3B:
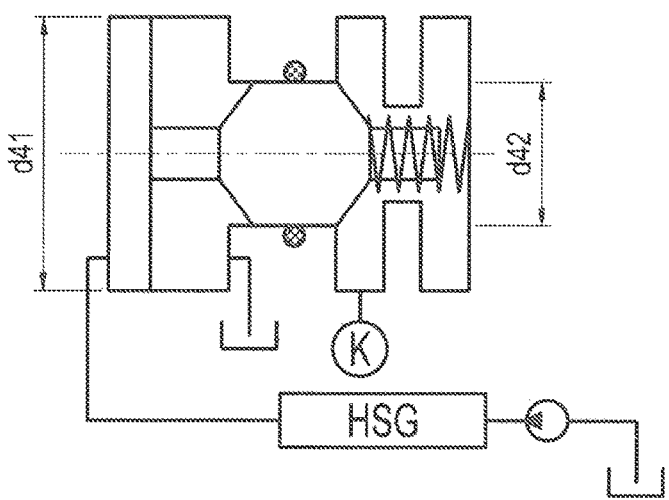
FIG. 3b a multi-part exemplary arrangement of a seat piston in a second position.

The seat piston 420 includes a stop piston 421 and an actuating piston 424, whereas the actuator piston 424 features an outer diameter d_41, which is larger than an outer diameter d_42 of the stop piston 421. In principle, the seat piston 420 corresponds to the seat piston 20 arising from FIGS. 1a and 1b, whereas the piston section 24 has been separated from the rest of the seat piston 20. If, starting from a second shifting position of the seat piston 420 shown in FIG. 3b, upon the actuation of the stop valve 401 in a barrier pressure chamber 431, the barrier pressure p_S acts on the actuating piston 424, it is displaced in a bore section 442 of a valve bore 439 and is pressed against the stop piston 421. In this manner, it is pressed in a bore section 443 against a sealing seat 438, and is thus moved into the first shifting position. A compensating pressure chamber 432 formed on the other side of the actuating piston 424 within the bore section 442 is vented, such that an ambient pressure p_0 prevails in it. The two-part design of the seat piston 420 has the advantage that, upon a tolerance-related axial displacement of the central axes of the bore sections 442 and 443, due to the decoupling of the actuating piston 424 from the stop piston 421, these can be displaced against each other in a manner corresponding to the axis offset, and the jamming of the seat piston 420 within the valve bore 439 is avoided.

In a hydraulic diagram, FIG. 4 shows a hydraulic control device of an automatic transmission, in which a stop valve in accordance with the invention is used. The hydraulic system features five shift elements K_A, K_B, K_C, K_D and K_E. Each of the shift elements, which may also include a frictional-locking starting element, but not also a positive-locking shift element, is allocated with a stop valve 101A, 101B, 101C, 101D and 101E. Through a respective barrier pressure port 131A, 131B, 131C, 131D and 131E, all stop valves are collectively subjected to a barrier pressure p_S. The barrier pressure port 131A to E thereby corresponds to the pressure chamber 31 in FIGS. 1a and 1b. In a hydraulic shift device HSG, which, just like the entire hydraulic system, is supplied with pressure oil by a pump P, the barrier pressure p_S is adjusted in its amount by a barrier pressure adjusting device 105. For each shift element K_A, K_B, K_C, K_D and K_E, for the adjustment of the respective clutch pressure p_K, the hydraulic shift device HSG also comprises a clutch valve 104A, 104B, 104C, 104D and 104E as a pressure adjusting device, whereas each is allocated to the shift element with the same index.

A barrier pressure valve 102 formed as a directional valve is arranged between this part of the hydraulic shift device HSG and the stop valves 101A, 101B, 101C, 101D, 101D and 101E, which in this example is electromagnetically shiftable into two shifting positions. In a first shifting position, a barrier pressure channel 108, to which all stop valves 101A, 101B, 101C, 101D and 101E are connected in parallel, are connected to a corresponding pressure adjusting device of the hydraulic shift device HSG. In a second shifting position shown in FIG. 4, the barrier pressure channel 108 is vented or is connected to a pressureless area 141, as the case may be, and the barrier pressure ports 131A, 131B, 131C, 131D and 131E is thus pressureless. In this manner, the stop valves 101A, 101B, 101C, 101D and 101E are opened, and the shift elements K_A, K_B, K_C, K_D and K_E are pressureless. What is not shown is a redundant venting option for the secure venting of the barrier pressure ports in the event of an engine stop or the switching off of the pump P, in order to ensure the "normally opened" function.

As an alternative to the design of the pressure holding valve 102 as a shifting valve, an arrangement as a pressure control valve is conceivable, which is effective as a pressure adjusting device and adjusts the amount of the barrier pressure p_S. In this manner, advantageously, no additional pressure adjusting device for adjusting the barrier pressure p_S would be required.

Through the arrangement of the stop valves 101A, 101B, 101C, 101D and 101E described under FIG. 4, all shift elements K_A, K_B, K_C, K_D and K_E are simultaneously separated from the pump P, even those that are not subjected to a clutch pressure or do not transfer any torque, if such shift elements are designed as "normally opened."

It is possible that only one part of the shift elements of the automatic transmission is allocated to stop valves, which are open without pressure, and another part is allocated to stop valves, which are closed without pressure, in order engage a defined transmission stage after the stopping of the vehicle engine with a following start and without being able to start without a delay.

FIG. 5 shows the chronological curves of the clutch pressures, the clutch valve pressures and the barrier pressures of two shift elements for various changes in the operating states.

Starting from a stationary operating state at the point in time T0, with a closed shift element, upon an intended reduction in the clutch pressure p_K1 for the purpose of changing the transmission stage with a shifting command, the barrier pressure p_S is raised at the point in time T1 to the extent that the clutch valve pressure P_V1 can be increased through the enclosed clutch pressure p_K1 at the point in time T2. At a lower barrier pressure, the clutch valve pressure would already, at a lower value, shift the stop valve into the second shifting position and the clutch pressure would fall to the value of the clutch valve pressure, by which the shift element would undesirably open. In this manner, the barrier pressure p_S at the point in time T1 is selected such that the clutch valve pressure reached at the point in time T2 is sufficient to, together with the clutch pressure and, if applicable, the force of an optional compression spring, shift the stop valve into the second shifting position, by which the pressure chamber 34 is connected to the pressure chamber 33 and the clutch pressure is raised to the value of the clutch valve pressure. The excessive raising of the clutch pressure p_K1 has no adverse effects on the transfer of torque, since the clutch K1 was already closed and the torque was transferred without slip. After this state has been adjusted with certainty, the pressure chamber 31 is vented and, at the point in time 3, the barrier pressure is reduced to ambient pressure. In this manner, the stop valve is securely in the second shifting position, and the pressure on the shift element may be modified by modifying the clutch valve pressure. Since the shift element K1 is to be opened in the shifting process after a certain displacement/time function and the new shift element K2 to be switched on must be closed, the clutch pressure p_K1 or the clutch valve pressure P_V1, as the case may be, is reduced at the point in time T4, and in the further course is reduced in a ramped manner to a pre-filling pressure level.

During the change of transmission ratio for reducing the clutch pressure p_K1 and lowering the torque transferable by the clutch, the shift element K2 to be switched on is filled with pressure oil and, through an increase to the clutch valve pressure p_V2 and thus the clutch pressure p_K2, it is raised to its transfer capability. At the point in time T5, the target value of the clutch pressure p_K2 is reached and the shift element K2 is thus closed. After the shifting process is complete, a stationary operating state arises, in which the torque is transferred without slip, such that the stop valve of the shift element K2 can be moved into the first shifting position to trap the clutch pressure p_K2 in the shift element K2 and separate it from the rest of the hydraulic system. For this purpose, at the point in time T6, the pressure barrier p_S is raised to the extent that the stop valve is shifted into the first shifting position of the stop valve, counter to the forces arising from the clutch pressure p_K2, the clutch valve pressure p_V2 and the optional compression spring, if present.

After reaching the first shifting position of the stop valve, the shift element K2 is separated from the rest of the hydraulic system and traps the clutch pressure p_K2, such that, for its maintaining, a correspondingly high clutch valve pressure p_V2 is not required. Thus, at the point in time T7, this can be lowered to a low pressure level, such as the pre-filling pressure. The barrier pressure p_S can also be lowered after reducing the clutch valve pressure, since only a small clutch valve pressure counteracts this and, on the basis of the ratios of the effective areas, the lowered p_S is sufficient to retain the first shifting position of the stop valve and to enclose the clutch pressure p_K2. The system pressure p_SYS, and thus the pressure to be generated by the pump P, may now be lowered to the level of the barrier pressure p_S. The barrier pressure p_S for holding the clutch pressures is, outside of the gearshift, likewise at a very low pressure level of approximately 0.5-2.0 bar.

Between T8 and T9, the clutch valve pressure p_V is at the pre-filling pressure level. The barrier pressure p_S is greater than or equal to the sum of the forces acting on the seat piston arising from the clutch pressure p_K, the clutch valve pressure p_V and, if applicable, the force of the spring.

Outside of the shifting process, in FIG. 5, the chronological curve of pressures for one method is shown, as the hydraulic control device is operated for a requested change, increase or decrease in the clutch pressure p_K2, as the case may be. Starting from a stationary state at the clutch K2 existing after the point in time T8, upon the triggering of the forthcoming clutch pressure change, the barrier pressure p_S is raised at the point in time T9 to a value that enables the stop valve to be held in the first shifting position, until, at the point in time T10, the clutch valve pressure p_V2 is greater than or equal to the clutch pressure p_K2, and is thus large enough to shift the stop valve to the second shifting position counter to the barrier pressure p_S. The pressure chambers 33 and 34 are now connected to each other, and the clutch valve pressure p_V2 acts on the entire projection surface A_4, as shown in FIGS. 1a and 1b. Since the stop valve must remain open during the change to the clutch pressure p_K2 through the clutch valve pressure p_V2, at the point in time T11, the barrier pressure p_S is lowered to the extent the stop valves of the other shift elements, which are pressurized and blocked, remain closed.

Subsequently, the clutch valve pressure p_V2 is further raised up to the point in time T12, as is necessary, e.g. if a higher torque is to be transferred from the shift element K2. Subsequently, the clutch valve pressure p_V2, and thus the clutch pressure p_K2, is lowered, and at the point in time T13 reaches a minimum clutch pressure value p_K2*. Such a reduction is necessary (for example) in order to produce a slip or a difference in rotational speeds at the clutch. Thereby, the minimum achievable clutch pressure value p_K2* is indicated by the adjusted barrier pressure level. Upon falling below the minimum clutch pressure value p_K2*, the force arising from the barrier pressure p_S at the seat piston would prevail, and it moves into the first shifting position, by which the clutch pressure p_K2 at the minimum level p_K2* would be enclosed.

In the illustration, after reaching the maximum clutch pressure value p_K2* at the point in time T13 through increasing the clutch valve pressure p_V2, the clutch pressure p_K2 is once again raised to the level that is reached at the point in time T14, and at which the shift element K2 is closed and can transfer the torque without slip. Theoretically, however, a slip-afflicted operating state can also be adjusted in a stationary manner, such that it is unchanged over time. In order to trap the clutch pressure K2 at the desired level, at the point in time T15, the barrier pressure p_S is raised to the extent that the stop valve is closed counter to the clutch pressure, the clutch valve pressure and the optional spring force. The clutch pressure p_K2 is now enclosed in the shift element K2 and, at the point in time T16, the clutch valve pressure p_V2 can be lowered to the pre-filling pressure. Subsequently, at the point in time T17, the barrier pressure p_S can also be reduced, such that the pressure to be generated by the pump, and thus its power consumption, is reduced.

Based on the surface ratios at the stop valve, it is also possible to, with a closed stop valve 1, simultaneously raise the system pressure, the barrier pressure and the clutch valve pressure (for example, at the points in time T1 and T2), such that the time delay between the points in time can be cut.

In the event of a failure (power failure), it must be reliably ensured that the pressure chamber 31, which is subjected to barrier pressure p_S, is vented. For this purpose, a venting device in the HSG is redundantly provided; this is activated only in the hydraulic emergency operation.

If, due to the thermal expansion of the trapped operating medium because of the temperature increase in the transmission, the clutch pressure p_K increases in a blocked shift element, the force components prevail for the opening of the sealing seat 38 at the stop valve 1, which leads to the escape of the excess clutch pressure p_K. As soon as equilibrium between the clutch pressure p_K and the barrier pressure p_S once again prevails, the stop valve 1 automatically closes. In this manner, component damage caused by impermissibly high pressures can be avoided.

Modifications and variations can be made to the embodiments illustrated or described herein without departing from the scope and spirit of the invention as set forth in the appended claims.

REFERENCE SIGNS

1 Stop valve
20 Seat piston
24 Piston section
25 Piston section
26 Piston section
27 Spring guide bolt
28 Compression spring
30 Housing
31 Pressure chamber
32 Pressure chamber
33 Pressure chamber
34 Pressure chamber
35 Sealing element
38 Sealing seat
39 Valve bore
41 Ventilation; pressureless area
42 Bore section
43 Bore section
101A Stop valve for shift element K_A
101B Stop valve for shift element K_B
101C Stop valve for shift element K_C
101D Stop valve for shift element K_D
101E Stop valve for shift element K_E
102 Barrier pressure valve
104A Clutch valve
104B Clutch valve
104C Clutch valve
104D Clutch valve
104E Clutch valve
105 Barrier pressure adjusting device
108 Barrier pressure channel
131A Barrier pressure port
131B Barrier pressure port
131C Barrier pressure port
131D Barrier pressure port
131E Barrier pressure port
141 Pressureless area
301 Stop valve
320 Seat piston
324 Stop bolt
325 Piston section
326 Piston section
331 Barrier pressure chamber
333 Clutch pressure chamber
334 Clutch valve pressure chamber
338 Sealing seat
401 Stop valve
420 Seat piston
421 Stop piston
424 Actuating piston
431 Barrier pressure chamber
433 Clutch pressure chamber
434 Clutch valve pressure chamber
432 Compensating pressure chamber
433 Clutch pressure chamber
434 Clutch valve pressure chamber
438 Sealing seat
439 Valve bore
442 Bore section
443 Bore section
A_1 Effective area
A_2 Effective area
A_3 Effective area
A_4 Effective area
d_Diameter
d_2 Diameter
d_3 Diameter
d_32 Diameter
d_41 Diameter
d_42 Diameter
HSG Hydraulic shift device
K Shift element, clutch
K1 Shift element, clutch
K2 Shift element, clutch
K_A Shift element, clutch A
K_B Shift element, clutch B
K_C Shift element, clutch C
K_D Shift element, clutch D
K_E Shift element, clutch E
P Pump
p_0 Ambient pressure
p_K Clutch pressure
p_K1 Clutch pressure
p_K2 Clutch pressure
p_K2* Clutch pressure
p_S Barrier pressure p_SYS System pressure
p_V Clutch valve pressure
p_V1 Clutch valve pressure of clutch 1
p_V2 Clutch valve pressure of clutch 2
T0 to T17 Point in time

The invention claimed is:

1. A hydraulic control device for an automatic transmission, the hydraulic control device comprising:
a stop valve allocated to a frictional-locking shift element;
a pressure adjusting device allocated to the frictional-locking shift element;
a barrier pressure adjusting device allocated to the stop valve;
wherein the frictional-locking shift element is closed and transfers torque when pressurized through a hydraulic actuating pressure generated by a pump and adjusted in the pressure adjusting device,
wherein the stop valve in a first shifting position seals the frictional-locking shift element at the pressure adjusting device such that a clutch pressure enclosed in the frictional-locking shift element does not decrease,
wherein the stop valve is formed and arranged in the hydraulic control device such that the stop valve is held in the first shifting position by a barrier pressure generated by the pump, and
wherein, upon a standstill of the pump or a falling below of a certain value of the pressure generated by the pump and the barrier pressure, the stop valve is automatically displaceable into a second shifting position such that the frictional-locking shift element is connected to the pressure adjusting device.

2. The hydraulic control device of claim 1, further comprising an additional stop valve allocated to an additional frictional-locking shift element such that the additional stop valve is held in the second shifting position through the barrier pressure generated by the pump, and
wherein, with the pump at a standstill or the falling below of a certain value of the barrier pressure, the additional stop valve is automatically displaceable into the first shifting position, sealing the additional frictional-locking shift element at the respective pressure adjusting device.

3. The hydraulic control device of claim 1, wherein the stop valve is a shiftable seat valve, the shiftable seat valve comprising a seat piston, the seat piston received and axially displaceable within a valve bore formed in a housing, the seat piston having a first effective area at a first end of the seat piston, the first effective area subjectable to the barrier pressure, the seat piston having a second effective area at a second end of the seat piston, the second effective area subjectable to an additional pressure in an opposite direction relative to the barrier pressure.

4. The hydraulic control device of claim 3, wherein the stop valve has four ports, one port of the four ports connected to a pressureless area.

5. The hydraulic control device of claim 4, wherein a valve bore of the stop valve extends in a radial direction to form four pressure chambers, wherein,
in a first pressure chamber of the four pressure chambers, the barrier pressure is effective at the first effective area;
a second pressure chamber of the four pressure chambers is vented;
a third pressure chamber of the four pressure chambers is connected directly to the frictional-locking shift element;
a fourth pressure chamber of the four pressure chambers is pressurizable by a clutch valve;
a circle-shaped or ring-shaped sealing seat is formed at a housing between the third and the fourth pressure chambers, at which:
the seat piston abuts the sealing seat in the first shifting position of the stop valve;
the third pressure chamber is separated from the fourth pressure chamber,
a surface area of an axial projection at the second end of the seat piston, radially outside of the sealing seat in the third pressure chamber, is subjectable to the clutch pressure, and forms the second effective area, the second effective area being ring-shaped;
an additional surface area of the axial projection at the second end of the seat piston within a circle delineated by the sealing seat is subjectable to a clutch valve pressure in the fourth pressure chamber, and forms a third effective area; and
the third and the fourth pressure chambers are connected to each other in the second shifting position of the stop valve such that pressures of the third and the fourth pressure chambers correspond to the clutch valve pressure of the clutch valve, the clutch valve pressure of the clutch valve effective at the second and third effective areas on the second end of the seat piston in the second shifting position of the stop valve.

6. The hydraulic control device of claim 5, wherein the seat piston comprises multiple cylindrical piston sections, wherein,
at the first end of the seat piston, a front surface has a circular cross-section at a first piston section of the multiple cylindrical piston sections;
a first tappet section of the multiple cylindrical piston sections is a cylindrical piston section of the multiple cylindrical piston sections with the largest diameter;
at least one cylindrical piston section of the multiple cylindrical piston sections is disposed at the second end of the seat piston; and
a transition from a second piston section to a third piston section of the multiple cylindrical piston sections forms a ring-shaped surface, which with the housing forms the ring-shaped sealing seat between the third and fourth pressure chambers.

7. The hydraulic control device of claim 6, wherein the ring-shaped sealing seat is a flat seat with an elastomer seal, wherein the elastomer seal is arranged on the housing and/or on the seat piston.

8. The hydraulic control device of claim 6, wherein a sealing element is mounted between the vented second pressure chamber and the third pressure chamber at an inner contour of the housing and/or at a cylindrical outer contour of the seat piston.

9. The hydraulic control device of claim 5, wherein the seat piston comprises multiple piston sections, wherein,
at the first end of the seat piston, a front surface has a circular cross-section at a first cylindrical piston section;
a first tappet section of the multiple cylindrical piston sections is a cylindrical piston section of the multiple cylindrical piston sections with the largest diameter;
the seat piston has a second cylindrical piston section of the multiple piston sections at a second end of the seat piston, a third piston section of the multiple piston sections is disposed at the second piston section, the third piston section having a conical, frusto-conical or spherical shape.

10. The hydraulic control device of claim 9, wherein a sealing element is mounted between the vented second pressure chamber and the third pressure chamber at an inner contour of the housing and/or at a cylindrical outer contour of the seat piston.

11. The hydraulic control device of claim 5, wherein ratio of the first, second and third effective areas to one another is selected such that the barrier pressure is less than the clutch pressure, the barrier pressure holding the stop valve in the first shifting position counter to the clutch pressure and the clutch valve pressure.

12. The hydraulic control device of claim 11, wherein the barrier pressure is at most three bar.

13. The hydraulic control device of claim 11, wherein with the pump at a standstill or the falling below of a certain value of the pressure generated by the pump, the stop valve is automatically displaceable by the clutch pressure enclosed in the shift element and/or by a force of a compression spring into the second shifting position.

14. The hydraulic control device of claim 5, wherein a compression spring is arranged between the second end of the seat piston and an adjacent end of the valve bore, the compression spring exerting a force in the direction of the second shifting position at the seat piston.

15. The hydraulic control device of claim 14, wherein L ratio of the first, second and third effective areas to each other is selected such that the barrier pressure is less than the clutch pressure, the barrier pressure holding the stop valve in the first shifting position counter to the clutch pressure sufficient for transferring maximum torque, the clutch valve pressure and a force of the compression spring.

16. The hydraulic control device of claim 5, wherein the stop valve is at least one stop valve, and wherein the friction-locking shift element is at least one friction-locking shift element, each stop valve of the at least one stop valve allocated to a respective shift element of the at least one friction-locking shift element, and wherein all the stop valves of the at least one stop valve are subjected to the same barrier pressure through the barrier pressure adjusting device.

17. The hydraulic control device of claim 5, further comprising an additional barrier pressure adjusting device for actuating the stop valve such that the barrier pressure of the pressure adjusting device and a barrier pressure of the additional barrier pressure adjusting device, independent of each other, are adjustable.

18. An automatic transmission with the hydraulic control device of claim 1.

19. The automatic transmission of claim 18, wherein the friction-locking shift element is formed such that the friction-locking shift element is opened if the actuating pressure falls below the certain value.

20. A method for controlling the automatic transmission of claim 18, wherein, starting from an operating state in which the shift element is closed below the clutch pressure, prior to an intended increase in the clutch valve pressure, the barrier pressure is raised in such a manner that the stop valve is moved into the second shifting position only if the clutch valve pressure is greater than or equal to the clutch pressure, and that, starting from an operating state in which the stop valve, and thus also the shift element, is opened and a subsequent shift element is then to be closed, a subsequent stop valve allocated to the subsequent shift element is closed after a clutch valve pressure of a subsequent clutch valve has been raised to the extent that the subsequent shift element is closed, and that, after lowering the clutch valve pressure of the subsequent clutch valve, the barrier pressure is lowered to a value that is sufficient to keep the subsequent stop valve in the first shifting position counter to a clutch pressure enclosed in the subsequent shift element.

* * * * *